Feb. 2, 1954 K. MEYER ET AL 2,668,042
METHOD OF BURNING AND SINTERING MATERIAL
Filed Jan. 19, 1951
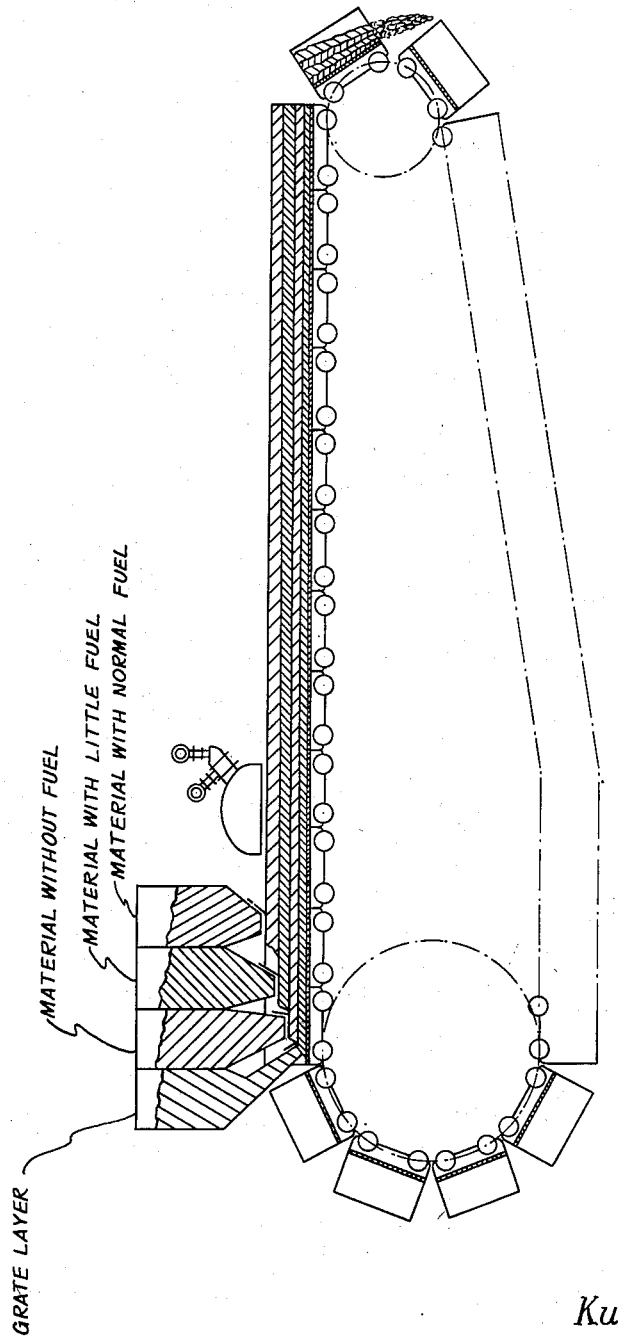
INVENTOR
Kurt Meyer
Hans Rausch
BY
Bailey, Stephens & Huettig
ATTORNEYS

Patented Feb. 2, 1954

2,668,042

UNITED STATES PATENT OFFICE 2,668,042

METHOD OF BURNING AND SINTERING MATERIAL

Kurt Meyer, Frankfurt am Main, and Hans Rausch, Frankfurt am Main-Fechenheim, Germany, assignors to Metallgesellschaft Aktiengesellschaft, Frankfurt am Main, Germany, a corporation of Germany Application January 19, 1951, Serial No. 206,939

Claims priority, application Germany, January 20, 1950

3 Claims. (Cl. 263—53)

This invention relates to a method of burning and sintering material.

In the known processes of sintering by induced draft, in order to achieve a success, e. g., for the agglomeration of fine material, or for the decomposition of carbonates or sulphates, e. g., in the burning of calcium carbonates, dolomite, magnesite, anhydrite, or gypsum, clay, high-melting initial materials for the production of silicate or mixtures of these substances, hitherto the raw materials were disintegrated to a size at least below 7 mms. In various industries, e. g., in the industries working lime, dolomite and magnesite, the raw material occurs in the dressing process in different grain sizes. For instance, for the burning or sintering in shaft furnaces, grain sizes above 30, mostly above 50 mms., are used in order to ensure a sufficient passage of air through the charge during the burning process. The finer grains could be worked up in revolving kilns but owing to the share of coarse grain sizes long preheating periods and primarily high burning temperatures in the sintering zone would be required. The furnace lining suffers through the intensive temperature stress. Therefore, it has to be replaced more frequently, for instance, than in revolving cement kilns. Hitherto an apparatus and a process are missing which would be adapted for the burning in an economic manner of grain sizes of 0 to about 40 mms.

In the normal induced draft sintering process it is oftentimes noted that a more intensive melting takes place in the lower layers than in the upper ones. This is due to the stagnations or accumulations of heat resulting by the fact that the sucked-on air is heated in an ever increasing measure by the material which is already sintered or burnt and past which it has to flow in order to get to the burning zone. The formation of molten material is undesirable in most fields of application of the induced draft sintering and represents a disadvantage of the method. Therefore, methods are known where this is counteracted by reducing the amount of fuel in the lower layers. However, hitherto it is not known to make the accumulation of heat an essential feature of the process. Hitherto, in the induced draft sintering—depending on the raw material used—layers of up to 50 cms. (burning of Portland cement) normally up to 30 cms. have been used.

The instant invention is diagrammatically illustrated in the accompanying drawing which shows a cross-sectional view through a sintering apparatus according to the invention.

According to our novel method for the burning, or burning and sintering, of difficultly melting substances, such as, carbonates of the alkaline earths or difficultly melting sulphates, such as gypsum or heavy spar or other substances or mixtures of substances of a high melting point, e. g., mixtures of sand-lime, from which initial materials for the industry of refractory stones are to be obtained, the method hitherto used is modified by increasing the layer above the grate to an amount of more than 30 cms., respectively in the case of cement more than 50 cms., up to about 3 meters or more. Thus the temperature rise in the lower layers of the charge on the grate reaches a maximum and the lower layers are lying for a much longer period in a zone of increased temperature. In order to safely avoid disturbing phenomena, e. g., in the burning of lime, an excessive burning which would be detrimental to its quality and binding power, according to the invention the material to be burnt, or to be burnt and sintered, may be used in grain sizes up to 50, advantageously 30 to 40 mms.

A disadvantage of the working in shaft furnaces is the advancing of the fire zone at the shaft walls. This apart from the high wear and tear of the furnace lining causes a non-uniform burning, since the fire cannot follow in the middle of the shaft. Special measures are required in order to curb the border fire. According to the invention this disadvantage can be removed by introducing at the side walls a layer of already burnt material or fresh material or a mixture of burnt and fresh material which is advantageously free from fuel or poor in fuel. By introducing this layer which is advantageously of a finer grain size than the normal charge, the resistance at the side walls is increased and the air for combustion is forced to pass through the portions of the charge containing the fuel. Moreover, it is possible to subdivide the charge into single classes of grains and to feed the same to the grate mixed with fuel, in such a manner that the coarse grains come to lie at the bottom and the finer ones on top. Thus the coarse grains are enabled to be exposed to elevated temperatures for a longer period. In order to make the burning process as intensive as possible from the outset, it is advisable to add a higher amount of fuel to the upper layers than to the lower ones.

My novel method is particularly suitable for the burning and sintering of limestone, dolomite, magnesite, or other substances required mainly in the industry of refractory material, such as clay or special mixtures of dolomite, sand, and other additions. Especially where fluxes are added and this burnt material is used as an intermediate product in the manufacture of refractory stones, the shard should be as dense as possible. The appearance of the agglomerate made according to the conventional sintering process is coral-like or spongy, while the sintered pieces made according to the new process, depending on their composition, are more scorified and molten.

In the conventional induced draft sintering process the insufficiently burnt or poorly sintered product was separated without difficulties from the satisfactory material by screening the whole yield. However, this is not possible in my novel process when burning non-sintering materials, since, for instance, satisfactorily burnt pieces of lime of a grain size of 20 to 30 mms. may lie beside poorly burnt ones of the same grain size so that separation by sieving is not possible. It has been found, however, that the specific gravity and the bulk density or volumetric weight of pieces burnt with different intensity differ from each other. By utilizing these properties, using an appropriate dressing method, e. g., pneumatic sifting or jigging machines, pneumatic concentrators, or the like, it is possible to achieve a sufficiently sharp separation of the individual qualities.

As is well known, hydraulic binders, such as, Portland cement, are also made after the process of induced draft sintering. Owing to the interaction of endothermic processes (dissociation of limestone) and exothermic reactions (formation of the single clinker minerals), careful dressing of the charge completed the essential features of the process. The introduction of about 60 percent and more of return material as a condensation nucleus for the formation of thin raw meal shells about the same was a requirement regarded as troublesome and unnecessary in the cement industry. For this reason, oftentimes it has been attempted to do without or with only a small quantity of return material, but this method could not be adopted in practice. In several plants making cement according to the induced draft sintering process the amount of return material is about 60 to 85 percent of the raw meal quantity. In order to safely obtain a satisfactory formation of clinker, the granular material was produced in special mixing apparatuses and charged on the grate mainly in grain sizes below 6 mms. As soon as the grains by careless working had a larger size, the same did not burn through and appeared as white balls, depending on their size, in the charge on the grate or in the yield, thereby affecting the quality thereof. By applying my novel high layer method, it is possible to do with less return material, to use coarser grains and to reduce the amount of fuel required. In order to obtain an intensive production of heat already in the top layers it is advisable to crumble the upper layer approximately as heretofore in a thickness of 10 to 50 cms. and with sufficient return material, while this is not necessary in regard to the layers underneath this top layer. The sinter obtained by my novel method is harder than the known Portland cement clinker obtained by the known induced draft sintering process, and in order to produce a predetermined amount of return material, it would be necessary to disintegrate finished Portland cement clinker. In order to avoid this, it is also possible to renounce the careful crumbling and more intensive ignition of the top layers so that the surface in a depth of several centimeters consists of unburnt or poorly burnt sinter which then when sifting the sintered material automatically gets into the return material. An important advantage which is secured by applying my novel high layer sintering method for the production of Portland cement or other sintered products of a similar composition consists in the saving of fuel. It is known that cement clinker which has been molten too intensively causes more difficulties in grinding and moreover does not have the high strength of a clinker which has been burnt less intensively. Therefore, in order to counteract the formation of molten material occurring by the high layer it is possible to reduce the fuel on the lower layers accordingly.

In this latter case and in similar cases, where agglomerate is produced contrary to the burning of lime, the separation of good and poor quality products can be carried out by the sieving process in the conventional arrangement.

*Example 1*

Limestone with 98 percent of $CaCO_3$ is applied in a layer of 3 meters thickness on a stationary grate of $0.8 \times 0.8$ meters length of the sides as follows:

The grate is covered by a layer of 20 cms. limestone which is free from fuel, in grain sizes of 15 to 30 mms.; on top of this is a layer of 2.1 tons of limestone (grain size 5 to 30 mms.) mixed with 240 kgs. of coke; on top of this is lying a layer of 0.25 tons of fine-grained lime, grain size 0.5 mms., mixed with 42.5 kgs. of coke which is applied in grain sizes up to 10 mms. After the surface has been ignited, e. g., by a gas flame, air is sucked through the burning charge with a negative pressure of about 300 to 400 mms. water column. The burnt material thus obtained, for instance, contains in the top layer in the grain sizes

| | |
|---|---|
| 0–5 mm | 0.61% $CO_2$ |
| 5–10 mm | 5.92% $CO_2$ |
| 10–15 mm | 5.5 % $CO_2$ |
| 15–20 mm | 8.95% $CO_2$ |
| more than 20 mm | 11.2% $CO_2$ (all by weight) |

In the layers underneath the respective figures are:

| | |
|---|---|
| 0–5 mm | 0% $CO_2$ |
| 5–10 mm | 0.11% $CO_2$ |
| 10–15 mm | 1.78% $CO_2$ |
| 15–20 mm | 1.48% $CO_2$ |
| more than 20 mm | 1.45% $CO_2$ |

*Example 2*

A crumbled mixture, comprising 270 kgs. of a dolomite sand mixture, 270 kgs. of return material, and 450 kgs. of coke are applied on a grate of $0.6 \times 0.6$ meters length of the sides and side walls of 1.5 meters height, and on ignition at the surface is sintered by passing air in the direction from top to bottom. The induced draft amounts to 400 mms. water column. By the sintering a cohering block of a high strength is obtained which is freed from poorly burnt and fine-grained material by suitable disintegrating and sifting devices and whose coarse granulations are used in the industry of the refractory materials.

While the invention has been described in detail with respect to certain now preferred examples and embodiments of the invention it will be understood by those skilled in the art after understanding the invention that various changes and modifications may be made without departing from the spirit and scope of the invention and it is intended, therefore, to cover all such changes and modifications in the appended claims.

What is claimed is:

1. A method of burning high melting point materials comprising forming a deep bed by arranging on a grate a first layer of coarse particles of the material, covering said first layer with less coarse particles of said material mixed with fuel, placing on the second layer of a third layer composed of fine particles of said material mixed with a greater proportion of fuel than said second layer whereby the fuel content of the assembled mass of layers decreases from the top to the bottom of the mass, igniting said fuel, and passing air downwardly through said mass.

2. A method as in claim 1, said material consisting of a Portland cement forming mixture, and said assembled mass of layers having a depth of about three meters.

3. A method as in claim 1, said material consisting of refractory forming mixture, and said assembled layers having a depth of about one and one-half meters.

KURT MEYER.
HANS RAUSCH.

References Cited in the file of this patent

UNITED STATES PATENTS

| Number | Name | Date |
|---|---|---|
| 1,315,952 | Dwight et al. | Sept. 16, 1919 |
| 1,688,422 | Hyde | Oct. 23, 1928 |
| 1,926,032 | Bunce et al. | Sept. 12, 1933 |
| 2,090,868 | Hyde | Aug. 24, 1937 |